No. 785,462. PATENTED MAR. 21, 1905.
J. G. WINGER.
TONGS.
APPLICATION FILED NOV. 25, 1904.
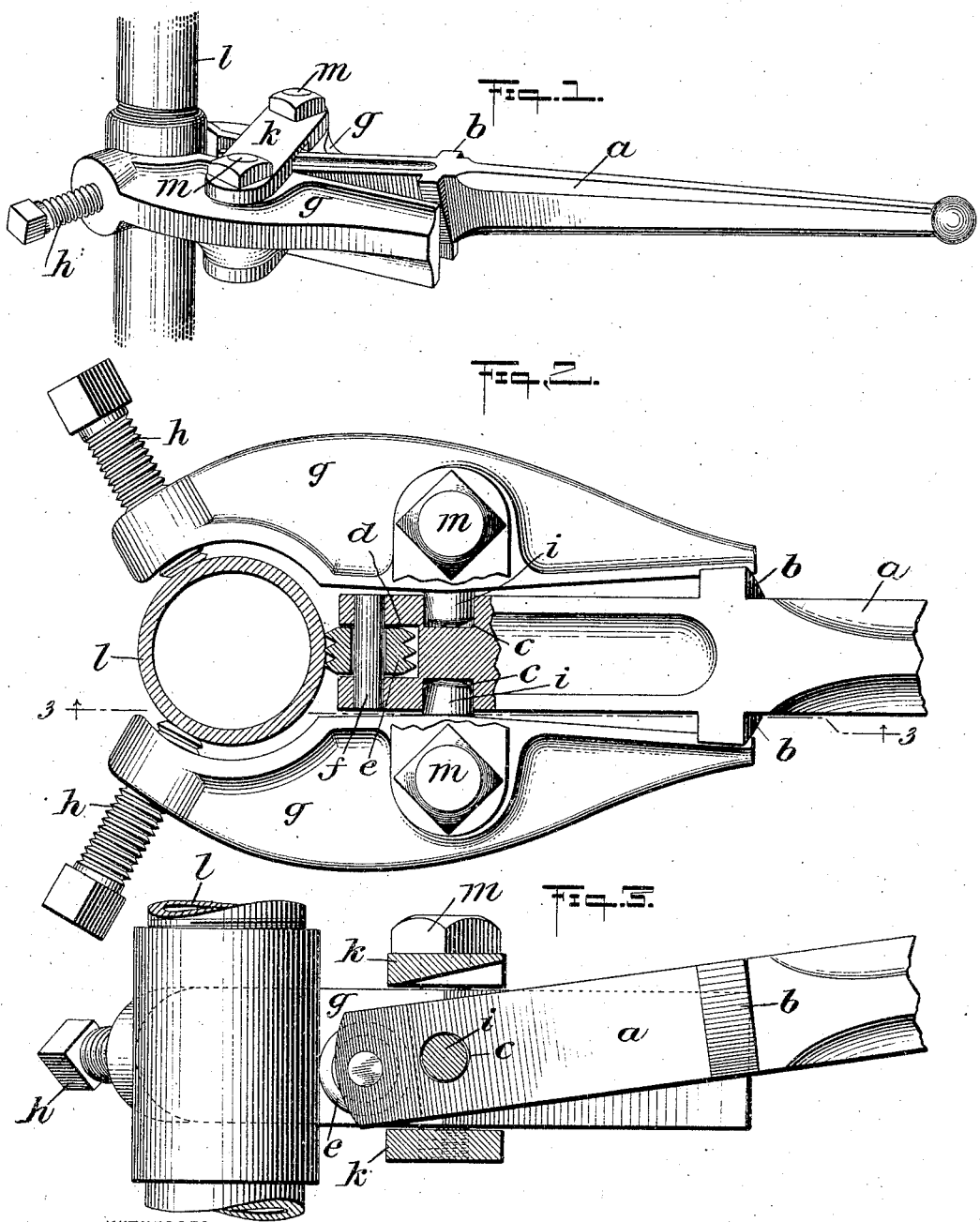
WITNESSES:
INVENTOR
Josiah G. Winger
BY
ATTORNEYS No. 785,462.

Patented March 21, 1905.

UNITED STATES PATENT OFFICE.

JOSIAH G. WINGER, OF GRAND VALLEY, PENNSYLVANIA.

TONGS.

SPECIFICATION forming part of Letters Patent No. 785,462, dated March 21, 1905.

Application filed November 25, 1904. Serial No. 234,178.

*To all whom it may concern:*

Be it known that I, JOSIAH G. WINGER, a citizen of the United States, and a resident of Grand Valley, in the county of Warren and State of Pennsylvania, have invented a new and Improved Tongs, of which the following is a full, clear, and exact description.

The invention relates to tongs intended particularly for gripping pipe and other round objects. They are especially useful in connection with oil and Artesian wells for holding the casing-collars during the time the pipe-sections are being engaged with or disengaged therefrom.

The device comprises a handle on which two peculiarly-arranged jaws are mounted, the structure being such that upon operating the handle the jaws may be caused to move toward or from the object being gripped, and these jaws coacting with a gripper on the handle serve securely to hold the pipe, casing-collar, or other part against turning movement in either direction.

Reference to the accompanying drawings shows as an example the preferred embodiment of my invention, in which drawings like letters of reference indicate like parts, and in which—

Figure 1 is a perspective view of the invention in use. Fig. 2 is an enlarged plan view, parts being broken away and in section, showing the jaws, the adjacent end of the handle, and the manner of mounting the jaws, and also illustrating the position of these parts with respect to the pipe or collar when the tongs are active; and Fig. 3 is a sectional elevation on the line 3 3 of Fig. 2.

$a$ indicates the handle, which is provided at its inner end portion with oppositely-situated cam-surfaces $b$. Inward from these surfaces the handle is formed with oppositely-situated sockets $c$, and at its inner extremity a cavity $d$ is formed. In this cavity is located a gripping-roller $e$, preferably having annular teeth thereon and mounted by a pin $f$, which is fastened on the inner end of the handle and extends across the cavity $d$, as shown most clearly in Fig. 2.

$g$ indicates the dogs, which are two in number and located one at each side of the inner portion of the handle. At their free or active ends the dogs are provided with screws $h$, threaded in the ends of the dogs and forming grippers adapted to engage the pipe or other object $l$. It will be observed that these grippers are adjustable, so as to readily adapt the tongs to objects of various sizes. The rear or outer extremities of the dogs are adapted, respectively, to bear on the cam-surfaces $b$, and said dogs are provided intermediate their ends with studs $i$, respectively entered into the sockets $c$. The dogs are held in this position and are allowed to rock the studs $i$ in the sockets $c$ by means of two links $k$, which are located one above and one below the dogs and are connected therewith by pins or bolts $m$. In this manner it will be observed that the dogs are mounted not only to swing around the pins or bolts $m$, rocking the studs $i$ in the sockets $c$, but the dogs are also allowed to swing around the centers of the studs $i$, so as to ride the ends of the dogs along the cam-surfaces $b$.

In the use of the device the grippers $h$ should be adjusted properly to engage the pipe, casing-collar, or other object with which the tongs are used, and the handle $a$ should be raised, as shown in Fig. 1, so as to allow the free or active ends of the dogs to move apart and permit the tongs to be passed around the object gripped, the gripping-roller $e$ engaging the object, as shown in Fig. 2. After this has been done the handle should be thrown down, thus forcing together the active ends of the dogs and causing the screws or grippers $h$ to impinge against the pipe. This, it will be observed, holds the pipe securely at three points of contact and effectually prevents turning the pipe in either direction. Owing to this arrangement the pipe-sections may be screwed or unscrewed without readjusting the tongs. As long as pressure is exerted on the handle the tongs will be active; but the instant the handle is raised slightly pressure on the jaws is relaxed and the jaws may be readily moved apart to disengage the part.

Various changes in the form, proportion, and details of my invention may be resorted to at will without departing from the spirit and scope thereof. Hence I consider myself entitled to all such variations as may lie within the intent of my claims.

Having thus described my invention, I claim as new and desire to secure by Letters Patent—

1. Tongs comprising two intermediately-pivoted dogs, and a handle located between the dogs and arranged to swing around an axis crossing the axes of the pivots of said dogs, the handle being capable of being wedged in between the dogs at one end of the dogs to force the dogs toward each other at the other end.

2. Tongs comprising two intermediately-pivoted dogs, and a handle located between the dogs and arranged to swing around an axis crossing the axes of the pivots of said dogs, the handle being capable of being wedged in between the dogs at one end of the dogs to force the dogs toward each other at the other end, the center of the swinging movement of the handle being intermediate the ends thereof, and one end portion of the handle projecting toward the working ends of the dogs to coact with the work.

3. Tongs comprising two intermediately-pivoted dogs, a handle located between the dogs and arranged to swing around an axis crossing the axes of the pivots of said dogs, the handle being capable of being wedged in between the dogs at one end of the dogs to force the dogs toward each other at the other end, the center of the swinging movement of the handle being intermediate its ends and one end of the handle projecting toward the working ends of the dogs, and a gripper mounted on said end of the handle and adapted to engage the work.

4. Tongs comprising two dogs, means extending between the ends and pivotally connected thereto intermediate their ends to allow the dogs to swing toward and from each other, and a handle located between the dogs and pivoted thereto on an axis crossing the axes of the pivots of the dogs, the handle and dogs having coacting surfaces at one end of the dogs whereby upon forcing the handle toward the dogs the dogs are forced together at the opposite end.

5. Tongs comprising two dogs, a link extending between the dogs, pivots connecting the dogs with the link intermediate the ends of the dogs, a handle fitted between the dogs, and a means mounting the handle to swing on an axis crossing the axes of said pivots of the dogs, the handle coacting with the dogs at one end to force the dogs to move toward each other at the other end.

6. Tongs comprising two dogs, a link extending between the dogs, pivots connecting the link with the dogs intermediate the ends of the dogs, studs projecting from the inner sides of the dogs, and a handle fitted between the dogs and having cavities in which the studs are loosely received.

7. Tongs comprising two dogs, a link extending between the dogs, pivots connecting the link with the dogs intermediate the ends of the dogs, studs projecting from the inner sides of the dogs, a handle fitted between the dogs and having cavities in which the studs are loosely received, said cavities in the handle being intermediate the ends thereof, and one end of the handle projecting toward the work, and a gripper attached to one end of the handle and adapted to engage the work.

In testimony whereof I have signed my name to this specification in the presence of two subscribing witnesses.

JOSIAH G. WINGER.

Witnesses:
 H. E. MILLER,
 HENRY H. BASSETT.